US012485673B2

(12) United States Patent
Ikeda

(10) Patent No.: US 12,485,673 B2
(45) Date of Patent: Dec. 2, 2025

(54) NOZZLE PLATE AND LIQUID DISCHARGE APPARATUS

(71) Applicant: NAKA LIQUID CONTROL CO., LTD., Moriguchi (JP)

(72) Inventor: Kouji Ikeda, Moriguchi (JP)

(73) Assignee: NAKA LIQUID CONTROL CO., LTD., Moriguchi (JP)

( * ) Notice: Subject to any disclaimer, the term of this patent is extended or adjusted under 35 U.S.C. 154(b) by 248 days.

(21) Appl. No.: 18/130,088

(22) Filed: Apr. 3, 2023

(65) Prior Publication Data

US 2023/0311508 A1 Oct. 5, 2023

(30) Foreign Application Priority Data

Apr. 5, 2022 (JP) ................................ 2022-062946

(51) Int. Cl.
*B41J 2/14* (2006.01)
*B41J 2/21* (2006.01)

(52) U.S. Cl.
CPC .................................. *B41J 2/1433* (2013.01)

(58) Field of Classification Search
CPC .......... B41J 2/1433; B41J 2/2114; B41J 2/211
See application file for complete search history.

(56) References Cited

U.S. PATENT DOCUMENTS

2011/0181674 A1 7/2011 Kang et al.
2019/0358664 A1* 11/2019 Ikushima ............ B41J 2/04588

FOREIGN PATENT DOCUMENTS

JP 2011152535 A 8/2011
JP 2017127837 A 7/2017
JP 2018047410 A 3/2018

* cited by examiner

*Primary Examiner* — Jason S Uhlenhake
(74) *Attorney, Agent, or Firm* — MH2 Technology Law Group, LLP

(57) ABSTRACT

Provided are a nozzle plate and a liquid discharge apparatus capable of sufficiently mixing a liquid. A nozzle plate 20 comprises a reservoir 21 for storing a liquid, a liquid channel 23 for introducing a liquid supplied from a liquid supply unit 100 into the reservoir, and a discharge channel 22*c* for discharging the liquid stored in the reservoir 21, wherein a mixing element 26 for mixing the liquid is freely detachably provided at the liquid channel 23.

8 Claims, 8 Drawing Sheets

NOZZLE PLATE AND LIQUID DISCHARGE APPARATUS

CROSS-REFERENCE TO RELATED APPLICATIONS

This application claims priority to Japanese Application No. 2022-062946 filed 5 Apr. 2022, the entire disclosure of which is hereby incorporated by reference in its entirety.

TECHNICAL FIELD

The present invention relates to a nozzle plate for discharging a liquid, and a liquid discharge apparatus comprising the nozzle plate.

BACKGROUND ART

Examples of a conventional liquid discharge apparatus for discharging mixed multiple different types of liquids include the print head described in Patent Literature (PTL) 1. In this print head, multiple different types of inks are mixed in the print head and discharged from a nozzle. The different types of inks are introduced into a damper from separate ink inlets through channels for different types of inks and mixed in the damper. The mixed ink is discharged from a nozzle by the driving force of a piezoelectric actuator.

CITATION LIST

Patent Literature

PTL 1: JP2011-152535A

SUMMARY OF INVENTION

Technical Problem

The liquid discharge apparatus described in PTL 1 is a print head in which inkjet printing inks are used as the different types of inks. These types of inks are introduced into a damper and are thoroughly mixed in the damper.

However, a liquid discharge apparatus may be used for discharging highly viscous liquids, such as adhesives or paints comprising two-component curable materials that are cured by mixing two different types of liquids. For discharging such highly viscous liquids, simply introducing liquids into a damper as in the print head described in PTL 1 may not achieve sufficient mixing of the liquids.

The present invention has been accomplished in view of the problems above. An object of the invention is to provide a nozzle plate and a liquid discharge apparatus capable of sufficiently mixing a liquid.

Solution to Problem

To achieve the above object, the present invention encompasses the subject matter described in the following Items.

Item 1: A nozzle plate comprising:

a reservoir for storing a liquid, a liquid channel for introducing a liquid supplied from a liquid supply unit into the reservoir, and a discharge channel for discharging the liquid stored in the reservoir, wherein a mixing element for mixing the liquid is freely detachably provided at the liquid channel.

According to the above configuration, a mixing element is provided within the nozzle plate, which discharges a liquid, whereby the liquid can be sufficiently mixed immediately before being discharged from the nozzle plate.

Item 2: The nozzle plate according to Item 1, which comprises a nozzle plate body comprising at least the reservoir and the discharge channel, and a joint part freely detachably provided with the nozzle plate body, the joint part being for connection to the liquid supply unit, wherein the mixing element is provided at a channel of the joint part constituting at least part of the liquid channel.

Item 3: The nozzle plate according to Item 1, which comprises a first member and a second member freely separably joined to the first member, wherein the first member and the second member are freely separable along a region in which at least the mixing element is provided in the liquid channel.

Item 4: The nozzle plate according to Item 3, which comprises a joint part for connection to the liquid supply unit, the joint part comprising the first member and the second member, wherein the mixing element is provided at a groove of the joint part constituting at least part of the liquid channel.

Item 5: The nozzle plate according to Item 3 or 4, which comprises a nozzle plate body comprising the reservoir and the discharge channel, the nozzle plate body comprising the first member and the second member, wherein the mixing element is provided at a groove of the nozzle plate body constituting at least part of the liquid channel.

Item 6: The nozzle plate according to any one of Items 3 to 5, wherein a face of the first member or a face of the second member, or both, the faces being joined to each other, include a groove.

Item 7: The nozzle plate according to any one of Items 3 to 6, wherein the faces of the first member and the second member are joined to each other through a sheet member.

Item 8: The nozzle plate according to any one of Items 5 to 7, further comprising multiple joint parts each connected to the liquid supply unit and into which different types of liquids are individually supplied from the liquid supply unit, wherein channels of the multiple joint parts constituting at least part of the liquid channel communicate with the groove of the nozzle plate body, and the different types of liquids are mixed by the mixing element.

Item 9: A liquid discharge apparatus for discharging a liquid by applying pressure to the liquid, comprising a pressurization unit and the nozzle plate of any one of Items 1 to 8 provided at the lower end of the pressurization unit, wherein the pressurization unit comprises a pressurization unit body, a pressurization member supported by the pressurization unit body in a freely movable manner in a vertical direction, the pressurization member protruding from the pressurization unit body such that the lower end part is housed in the reservoir, the pressurization member being for applying pressure to the liquid introduced into the reservoir from the liquid channel and discharging the liquid from the discharge channel, and a drive part for moving the pressurization member in the vertical direction.

Advantageous Effects of Invention

The present invention can provide a nozzle plate and a liquid discharge apparatus capable of sufficiently mixing a liquid.

DESCRIPTION OF EMBODIMENTS

Overall Configuration

Figure 1:
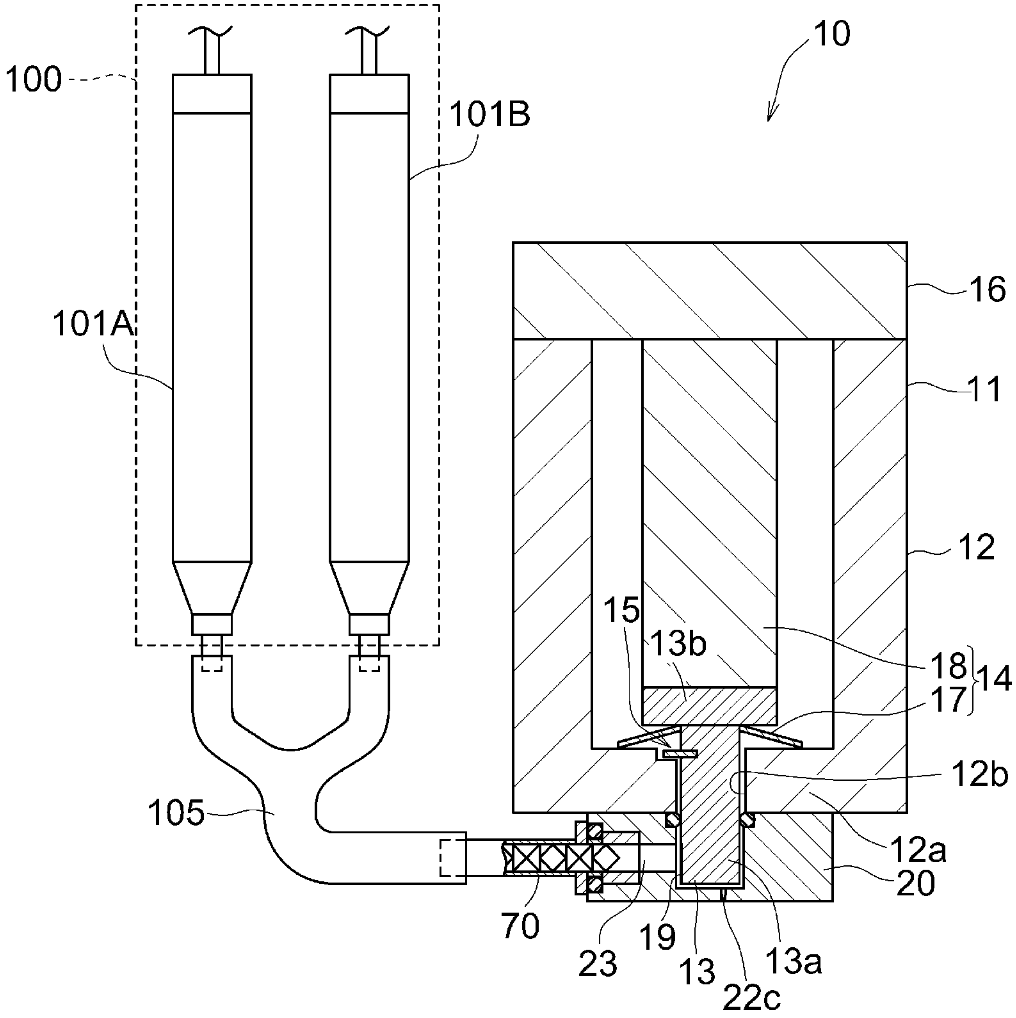
FIG. 1 is a cross-sectional view showing the overall schematic configuration of a liquid discharge apparatus according to one embodiment of the present invention.
Figure 2:
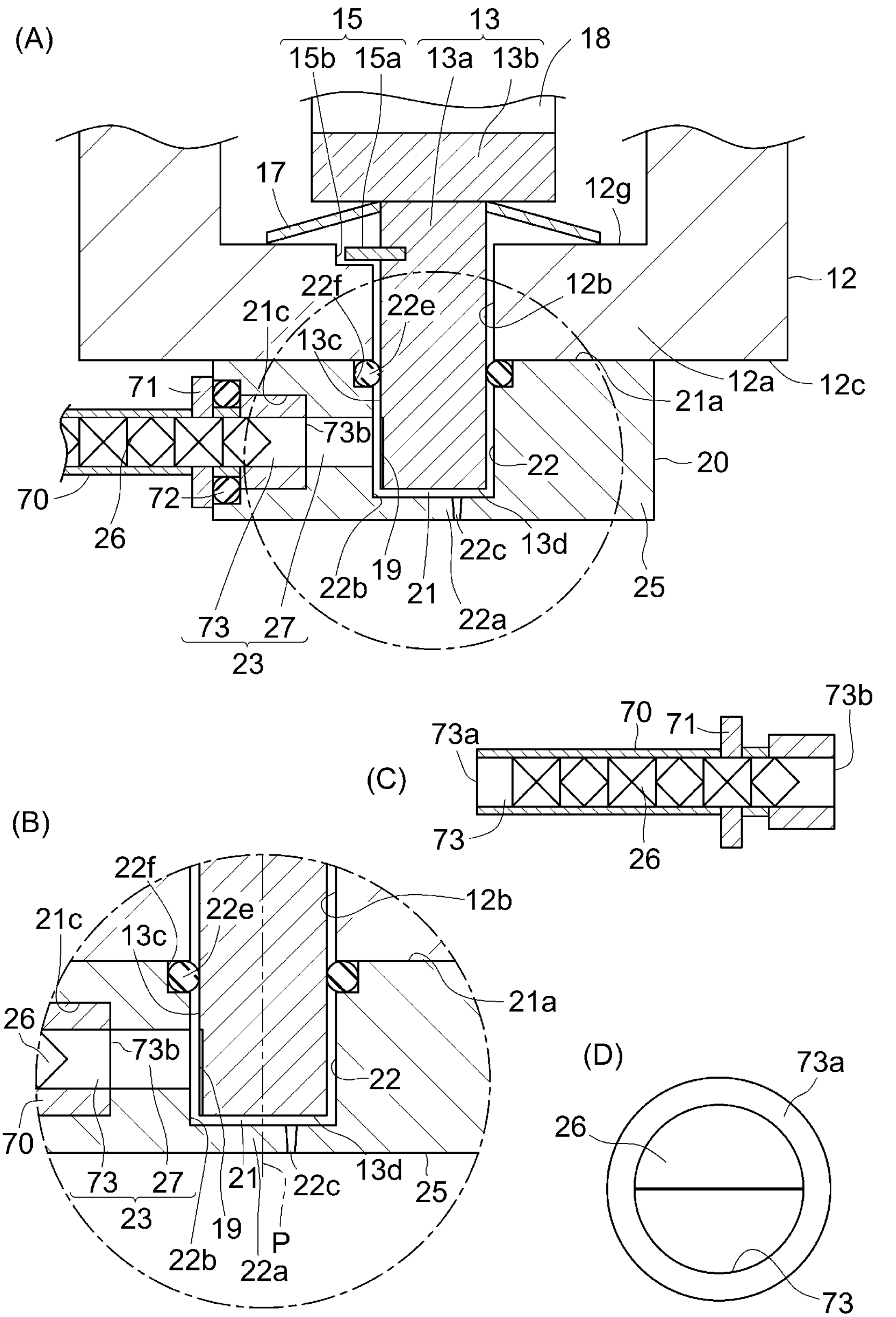
FIG. 2(A) is an enlarged cross-sectional view showing the main part of the liquid discharge apparatus, (B) is an enlarged cross-sectional view showing the main part of (A), (C) is a cross-sectional view showing the joint part along the axial direction, and (D) is a side view showing the joint part.

The embodiments according to the present invention are described with reference to the drawings. FIGS. 1 and 2 show a liquid discharge apparatus 10 according to one embodiment of the present invention. The liquid discharge apparatus 10 is for discharging a liquid by applying pressure to the liquid, and comprises a pressurization unit 11 and a nozzle plate 20 provided at the lower end of the pressurization unit 11. The liquid discharge apparatus 10 is connected to a liquid supply unit 100 for supplying a liquid to be discharged. In the following explanations, the axial direction of the discharge channel 22*c* of the nozzle plate 20, i.e., the direction in which the liquid is discharged, is referred to as the vertical direction in FIG. 1, and the direction orthogonal to the vertical direction is referred to as the left-right direction. However, the liquid discharge apparatus 10 is not necessarily required to discharge a liquid along the actual vertical direction (perpendicular direction). FIGS. 1 to 11 are used for illustrative purposes and do not show actual sizes or shapes.

Liquid Supply Unit 100

In the liquid supply unit 100, multiple (two in this embodiment) syringes 101A and 101B, each storing a different type of liquid, are connected, via a solenoid valve (not shown), to an air pressure source (not shown), such as an air compressor, that supplies pneumatic pressure to the syringes 101A and 101B. When the solenoid valve is opened, a predetermined pneumatic pressure is supplied from the air pressure source into the syringes 101A and 101B, and the liquids are pushed out and supplied to the liquid discharge apparatus 10. The syringes 101A and 101B may be individually provided with the air pressure source and the solenoid valve so as to control the operation of the syringes 101A and 101B separately. Alternatively, the syringes 101A and 101B may be provided with a single air pressure source and a single solenoid valve to control the operation of the syringes 101A and 101B. A liquid supply pipe 105 has two branches at one end, and the branched pipes are connected to the syringes 101A and 101B. A joint part 70 of the liquid discharge apparatus 10 is connected to the other end of the liquid supply pipe 105. The liquid supply unit 100 may also have a configuration in which a single syringe 101A is provided.

In this embodiment, a liquid to be discharged from the liquid discharge apparatus 10 is a two-component adhesive comprising a main agent and a curing agent, and adhesives, such as epoxy-based, acrylic-based, and silicone rubber-based adhesives, may be used. The main agent is contained in the syringe 101A while the curing agent is contained in the syringe 101B, and they are mixed within the nozzle plate 20 of the liquid discharge apparatus 10 and discharged. The adhesive to be discharged is preferably an adhesive having a viscosity of 30 Pa·s (pascal seconds) or less and a usable time (the time during which operation is possible after mixing the main agent and the curing agent) of 5 minutes or more. The liquid to be discharged is not limited to two-component adhesives. The liquid to be discharged may be a liquid that can achieve desired performance by mixing multiple liquids. In this case, the amounts of the liquids contained in the syringes 101A and 101B and introduced into the nozzle plate 20 are adjusted, the introduced liquids are mixed within the nozzle plate 20, and the resulting liquid having the desired performance is discharged from the liquid discharge apparatus 10. It is also possible that liquids with different colors are contained in the syringes 101A and 101B, the amount of each liquid introduced into the nozzle plate 20 is adjusted, the introduced liquids are mixed within the nozzle plate 20, and the resulting liquid with a desired color is discharged from the liquid discharge apparatus 10. When the number of the syringe 101A is one, a wide variety of any liquid, such as various adhesives, solder pastes, and fluxes, can be discharged after being mixed within the nozzle plate 20. Alternatively, the liquid supply unit 100 may include three or more syringes, and the liquids contained in the syringes may be mixed within the nozzle plate 20 and discharged.

In the present specification, unless otherwise specified, different types of liquids contained in the multiple syringes 101A and 101B, and a liquid obtained by mixing the different types of liquids and to be discharged from the liquid discharge apparatus 10, are collectively referred to as "liquid."

Liquid Discharge Apparatus 10

Pressurization Unit 11

As shown in FIG. 1, the pressurization unit 11 comprises a pressurization unit body 12, a pressurization member 13, a drive part 14, and a rotation control mechanism 15. The pressurization unit body 12 has a cylindrical shape with a bottom and an opening at the upper end, and the opening is closed with a base member 16. At the center of a bottom part 12*a* of the pressurization unit body 12 in plan view, a through hole 12*b* through which the pressurization member 13 is inserted is formed. The outer face 12*c* of the bottom part 12*a* is a face to which the nozzle plate 20 is attached.

As shown in FIG. 2(A), the pressurization member 13 is for applying pressure to a liquid introduced into a depression 22 from a liquid channel 23 of the nozzle plate 20 to discharge the liquid from the discharge channel 22*c*. The pressurization member 13 has a T-shaped cross-sectional shape and includes a cylindrical small diameter part 13*a* and a cubic or cuboid large diameter part 13*b*, which is attached to the upper end of the small diameter part 13*a*. The shape of the large diameter part 13*b* can also be cylindrical. The diameter of the small diameter part 13*a* is set to enable itself to insert into the through hole 12*b* of the pressurization unit body 12. In this embodiment, the diameter of the through hole 12*b* is set to about 3.1 mm, and the diameter of the small diameter part 13*a* is set to about 3.0 mm; however, the diameters are not limited to these values. The small diameter part 13*a* is inserted into the through hole 12*b* such that the lower end part protrudes outside the bottom part 12*a* of the pressurization unit body 12 and is housed in the depression 22 of the nozzle plate 20 described later. The length of the small diameter part 13*a* in the vertical direction is set to a length sufficient to enable application of pressure to the liquid contained in a reservoir 21 of the depression 22. On the other hand, the small diameter part 13*a* contracts slightly in the vertical direction due to the counterforce from the liquid in the reservoir 21 when pressure is applied, and the contraction causes energy loss; thus, the shorter the small diameter part 13*a*, the smaller the contraction and the loss. From this viewpoint, the small diameter part 13*a* is set as short as possible.

The large diameter part 13*b* is located inside the pressurization unit body 12. The size of the large diameter part 13*b* in plan view is set such that the large diameter part 13*b* does not come out from the through hole 12*b* of the pressurization unit body 12. An annular disc spring 17 is provided between the lower face of the large diameter part 13*b* and the upper face 12*g* of the bottom part 12*a* of the pressurization unit body 12. While the pressure application of an actuator 18 described later to the pressurization member 13 is released, the disc spring 17 presses the pressurization member 13 upward to the first position. With the disc spring 17 and the through hole 12*b* of the pressurization unit body 12, the pressurization member 13 is detachably supported by the pressurization unit body 12 in a freely movable manner in the vertical direction.

At the lower end part of the small diameter part 13*a* of the pressurization unit 11, a first channel 19 is formed to efficiently introduce the liquid introduced from the liquid channel 23 of the nozzle plate 20 into a bottom part 22*a* of the depression 22.

The rotation control mechanism 15 controls relative rotation around the central axis of the pressurization member 13. As shown in FIG. 2(A), the rotation control mechanism 15 includes a pin 15*a*, which is a protrusion protruding from the outer peripheral face 13*c* of the small diameter part 13*a* of the pressurization member 13, and a groove 15*b* with an open upper side provided on the upper face 12*g* of the bottom part 12*a* of the pressurization unit body 12. When the pin 15*a* is housed in the groove 15*b*, the rotation of the pressurization member 13 relative to the through hole 12*b*, i.e., relative to the depression 22 of the nozzle plate 20, in which the lower end part of the small diameter part 13*a* of the pressurization member 13 is housed, is controlled.

Between the pressurization member 13 and the base member 16, an actuator 18 comprising a piezoelectric element is attached. The actuator 18 is controlled by an actuator control unit (not shown) to perform expansion and contraction movements in the vertical direction. The upper face of the actuator 18 is in contact with the base member 16 by the pressing force of the disc spring 17, and the upward counterforce at the time of extension of the actuator 18 is supported by the base member 16.

The actuator 18 is in contact with but is not fixed to the upper face of the large diameter part 13*b* of the pressurization member 13. During the extension of the actuator 18, the lower face of the actuator 18 is in contact with the upper face of the large diameter part 13*b* of the pressurization member 13 to apply downward pressure to the pressurization member 13. This causes the pressurization member 13 to move downward against the pressing force of the disc spring 17 to the second position from the first position, to which the pressurization member 13 was pressed upward by the disc spring 17. The travel distance between the first and second positions is set to about 20 μm; however, the travel distance is not limited to this value. The actuator 18 and the disc spring 17 constitute the drive part 14.

The configuration of the pressurization unit 11 is not limited to the configuration shown in FIG. 1 and may be any configuration as long as pressure can be applied to the liquid contained in the reservoir 21 of the nozzle plate 20.

Nozzle Plate 20

As shown in FIGS. 1 and 2, the nozzle plate 20 comprises a depression 22 including a reservoir 21, in which a liquid is contained, a liquid channel 23 for introducing a liquid into the reservoir 21, and a discharge channel 22*c* for discharging the liquid contained in the reservoir 21. The nozzle plate 20 comprises a nozzle plate body 25 and a joint part 70, which is fitted into the nozzle plate body 25, and a mixing element 26 for mixing the liquid is freely detachably provided at the liquid channel 23.

As shown in FIGS. 1 and 2(A), the nozzle plate body 25 of the nozzle plate 20 has a substantially rectangular shape, and the upper face 21*a* is attached to the outer face 12*c* of the pressurization unit body 12 by means of a screw connection (not shown). In the upper face 21*a* of the nozzle plate body 25, the depression 22 is formed at a position corresponding to the through hole 12*b* of the pressurization unit body 12. The depression 22 is circular in plan view, and the diameter of the depression 22 is set to be substantially the same as the diameter of the through hole 12*b*. The depression 22 houses the lower end part of the small diameter part 13*a* of the pressurization member 13, which penetrates through the through hole 12*b*. In this embodiment, the shortest distance between the outer peripheral face 13*c* of the small diameter part 13*a* of the pressurization member 13 and the inner face 22*b* of the depression 22 is set to be about 5 μm; however, the shortest distance is not limited to this value. The reservoir 21 for storing a liquid is formed between the bottom face 13*d* of the pressurization member 13 and the bottom part 22*a* of the depression 22. Further, a step 22*f* is formed all the way around at the upper end of the inner face 22*b* of the depression 22 for housing an O-ring 22*e*. The O-ring 22*e* prevents the liquid in the reservoir 21 from flowing into the pressurization unit body 12.

The discharge channel 22*c* for discharging the liquid contained in the reservoir 21 of the depression 22 is formed at the bottom part 22*a* of the depression 22. The discharge channel 22*c* is circular in plan view and has a tapered shape with a smaller inner diameter toward the lower side. The discharge channel 22*c* is located at a position that is deviated from the axis P of the depression 22, including the gravity center position in plan view of the depression 22. In FIG. 2(B), the discharge channel 22*c* is formed at a position on the opposite side of the first channel 19 of the pressurization member 13 and the opening of the liquid channel 23 at the inner face 22*b* of the depression 22, with respect to the axis P defined as the center. In this embodiment, since the depression 22 is circular in plan view, the center point of the circle and the center of gravity are located on the axis P. This allows the liquid supplied from the liquid channel 23 and the first channel 19 of the pressurization member 13 to be filled entirely in the reservoir 21, and prevents the occurrence of air entrainment in the reservoir 21, thus preventing discharge failures. The position of the discharge channel 22*c* is not limited to that in this embodiment and can be any position at the bottom part 22*a* of the depression 22.

A hole 21*c* for connection with the joint part is formed at the side of the nozzle plate body 25, and the joint part 70 is freely detachably fitted in the hole. The joint part 70 is fixed to the nozzle plate body 25 with a joint fixing plate 71 through an O-ring 72 by screwing etc. As shown in FIG. 1, FIG. 2(A), and FIG. 2(C), in the interior of the joint part 70, a connection channel 73 extending linearly along a direction orthogonal to the vertical direction (the left-right direction in FIG. 2(A)) and having a circular cross-sectional shape is formed. A first end 73*a* of the connection channel 73 communicates with the interior of the liquid supply pipe 105 for connection to the liquid supply unit 100, and a second end 73*b* communicates with a body channel 27 of the nozzle plate body 25. The body channel 27 of the nozzle plate body 25 is linearly formed coaxially with the connection channel 73 and communicates with the depression 22. That is, the connection channel 73 and the body channel 27 constitute the liquid channel 23. The connection channel 73 of the joint part 70 houses the mixing element 26.

Mixing Element 26

Within the connection channel 73, a mixing element 26 for mixing different types of liquids supplied from the liquid supply unit 100 is freely detachably and freely rotatably disposed. The mixing element 26 is for mixing a fluid homogeneously by applying converting or reversing action to the fluid passing through the liquid channel 23. The mixing element 26 for use may be a known mixing element, and the shape of the mixing element 26 is not particularly limited. For example, the mixing element 26 may have right-twisting blades each obtained by twisting one end of a rectangular plate 180 degrees to the right rotational direction, and left-twisting blades each obtained by twisting one end of a rectangular plate 180 degrees to the left rotational direction, and these blades may be alternately arranged and joined together such that their ends in the longitudinal direction are orthogonal to each other. Alternatively, the mixing element 26 may have multiple plates engaged and crossed with each other at different angles. As shown in FIG. 2(D), when the mixing element 26 is viewed from one end side in the axial direction (side view), each blade has a circular shape whose diameter is set such that each blade of the mixing element 26 is abutted to the inner wall of the connection channel 73 without forming a gap between the inner wall of the connection channel 73 and the blades of the mixing element. FIG. 2(D) shows the connection channel 73 and the mixing element 26; other configurations are omitted. In this embodiment, the mixing element 26 has a length of 8 mm and a maximum diameter of 2.3 mm, and the connection channel 73 of the joint part 70 has a length of 10 mm and a diameter of 2.3 mm. However, they are not limited to those values.

The mixing element 26 is formed from metal or a synthetic resin. Examples of metal include, but are not limited to, stainless steel; and examples of synthetic resins include, but are not limited to, PP (polypropylene), POM (polyacetal), and nylon. In this embodiment, the mixing element 26 is in the form of a single bar; however, the mixing element 26 may also be divided multiple mixing elements. FIGS. 1 to 11 show a simplified form of the mixing element 26, and the actual size or shape are not shown.

The mixing element 26 is attached by inserting it into the connection channel 73 from the first end 73*a* side while the joint part 70 is fitted into the nozzle plate body 25. Alternatively, the mixing element 26 may be inserted while the joint part 70 is detached from the nozzle plate body 25. To detach the mixing element 26 from the connection channel 73, while the joint part 70 is detached from the nozzle plate body 25, the mixing element 26 is pushed from the first end 73*a* side and taken out from the second end 73*b* side.

Operation of Liquid Discharge Apparatus 10

The operation of the liquid discharge apparatus 10 according to this embodiment is described here. It is assumed that the reservoir 21 is already filled with a liquid from the liquid supply unit 100. If the reservoir 21 is not filled with a liquid in the initial state, a liquid from the liquid supply unit 100 is first filled in the reservoir 21. The liquid filling operation in the initial state is the same as the liquid filling operation described later.

In the liquid discharge operation, the actuator 18 moves the pressurization member 13 downward from the first position to the second position. The liquid contained in the reservoir 21 is pressed by the pressurization member 13 to be discharged from the discharge channel 22*c*. When the actuator 18 contracts after a predetermined time, the liquid discharge is stopped, and the pressurization member 13 is pushed up by the pressing force of the disc spring 17 to return to the first position.

After the liquid discharge operation, the liquid filling operation into the reservoir 21 is performed. The solenoid valve of the liquid supply unit 100 is opened, and a predetermined pneumatic pressure is supplied from the air pressure source into the syringes 101A and 101B to push different types of liquids out of the syringes 101A and 101B. The liquids flow into the reservoir 21 of the depression 22 through the liquid supply pipe 105, the connection channel 73 of the joint part 70 of the nozzle plate 20 of the liquid discharge apparatus 10, and the body channel 27 of the nozzle plate body 25. Since the mixing element 26 is disposed at the connection channel 73, the different types of liquids are sufficiently mixed by the mixing element 26 before flowing into the reservoir 21. After the liquid discharge operation is completed once, the liquid discharge apparatus 10 performs the liquid filling operation. The liquid supply operation and the liquid discharge operation are repeated alternately.

According to the above configuration, the mixing element 26 provided at the connection channel 73 of the joint part 70 achieves sufficient mixing of different types of liquids within the nozzle plate 20. Further, in this embodiment, the mixing element 26 is disposed within the liquid channel 23 (the connection channel 73), which communicates with the reservoir 21, and the two different liquids supplied from the liquid supply unit 100 are mixed immediately before being discharged from the nozzle plate 20. When the liquid to be discharged is a mixture of multiple different types of liquids, such as a two-component adhesive, and is a liquid whose viscosity increases after mixing, the viscosity of the mixed liquid can be prevented from increasing at the time of discharge since the mixing is performed immediately before discharge, and the time between the mixing and discharging is short.

As the liquid supply operation and the liquid discharge operation are repeated, the liquid remains and the remained liquid solidifies in the liquid channel 23 of the nozzle plate 20 and the mixing element 26; thus, the liquid channel 23, the reservoir 21, the discharge channel 22*c*, etc. must be cleaned periodically. Cleaning is also required when the liquid to be discharged is changed. An operator can detach the joint part 70 of the nozzle plate 20 from the nozzle plate body 25, and remove the mixing element 26 from the connection channel 73 of the joint part 70, which makes it easier to clean the connection channel 73, the body channel 27, and the mixing element 26. In particular, when the liquid to be discharged from the nozzle plate 20 is a two-component curable adhesive comprising a main agent and a curing agent or is a UV-curable resin, the liquid is likely to remain and solidify in the liquid channel 23, the reservoir 21, and the discharge channel 22*c* of the nozzle plate 20, requiring frequent cleaning; thus, ease of cleaning is important.

In the mixing element 26, the end of a right-twisting blade and the end of left-twisting blade are connected multiply in the longitudinal direction as described above. The connected portion can be broken when a tensile force or a force in the twisting direction is applied to the mixing element 26. For this reason, attempting to pull the mixing element 26 out of the joint part 70 may cause the breakage of the mixing element 26. In this embodiment, since the joint part 70 is freely detachable from the nozzle plate body 25, the joint part 70 can be detached from the nozzle plate body 25 to remove the mixing element 26 by pushing, which can prevent the breakage at the time of removal of the mixing element 26.

Other Embodiments

Figure 3:
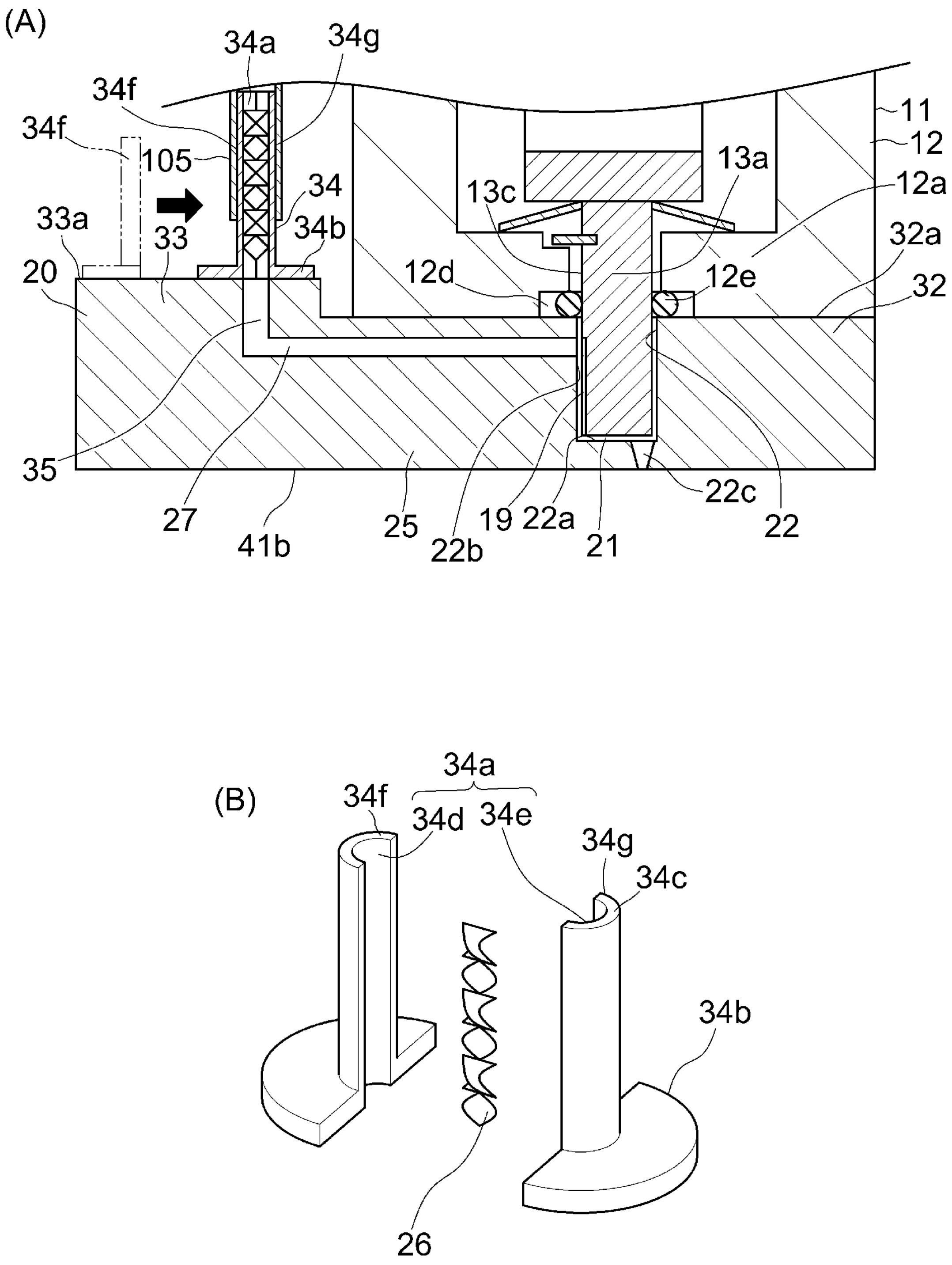
FIG. 3(A) is an enlarged cross-sectional view showing the main part of another example of the nozzle plate, and (B) is an exploded perspective view showing the joint part.

Although one embodiment according to the present invention is described above, the present invention is not limited to the above embodiment, and various modifications are possible without departing from the spirit of the present invention. FIG. 3 shows another embodiment. In the embodiment shown in FIGS. 3(A) and 3(B), the nozzle plate body 25 is rectangular in plan view. In FIG. 3(A), the thickness (the length in the vertical direction) of a portion 32 on one end side on the right (also referred to as the "right side portion") is smaller than that of a portion 33 on the other end side on the left (also referred to as the "left side portion"). The upper face 32*a* of the right side portion 32 is attached to the outer face 12*c* of the bottom part 12*a* of the pressurization unit body 12 of the pressurization unit 11.

On the upper face 33*a* of the left side portion 33, a single joint part 34 for connection with the liquid supply unit 100 is provided. As shown in FIG. 3(B), the joint part 34 includes a cylindrical base 34*b*, which is connected to the nozzle plate body 25 by means of screws or other connecting means (not shown), and a cylindrical connection part 34*c* provided continuously from the base 34*b*, having a smaller diameter than that of the base 34*b*, and to which the liquid supply pipe 105 is connected. The base 34*b* and the connection part 34*c* are composed of a joint first member 34*f* and a joint second member 34*g*. The joint first member 34*f* and the joint second member 34*g* are halves of the same shape, divided along the vertical direction. The joint first member 34*f* and the joint second member 34*g* have grooves 34*d* and 34*e*, respectively, which are formed along the vertical direction on the faces that are joined to each other (also referred to as the "joint faces"). While the joint faces are joined together, the grooves 34*d* and 34*e* form a connection channel 34*a*. The grooves 34*d* and 34*e* each have a semicircular cross-sectional shape, and the connection channel 34*a* has a circular cross-sectional shape. In the connection channel 34*a* of the joint part 34, a mixing element 26 is freely detachably provided, and the diameter of the connection channel 34*a* is set to a length such that the mixing element 26 can be housed. That is, the connection channel 34*a* of the joint part 34 is at least part of the liquid channel 23, and the joint first member 34*f* and the joint second member 34*g* are freely separable along the connection channel 34*a*, which is a region in which at least the mixing element 26 is provided in the liquid channel 23.

The connection channel 34*a* communicates with an introductory channel 35 provided along the vertical direction within the nozzle plate body 25. The introductory channel 35 communicates with the depression 22 through the body channel 27.

A step 12*d* for housing an O-ring 12*e* is formed on the outer face 12*c* of the pressurization unit body 12 of the pressurization unit 11 and around the through hole 12*b* such that the O-ring 12*e* prevents the liquid in the nozzle plate 20 from flowing into the pressurization unit body 12. Further, screw holes are provided on the outer face 12*c* to attach the nozzle plate 20.

According to the above configuration, the mixing element 26 is provided at the connection channel 34*a* of the joint part 34; thus, the liquid supplied from the liquid supply unit can be mixed. Further, the joint first member 34*f* and the joint second member 34*g* are freely separable, making it easy to attach or detach the mixing element 26, and to clean the grooves 34*d* and 34*e* and the mixing element 26. Since other configurations are the same as those in the embodiment shown in FIG. 1, the same reference numerals are used to refer to corresponding parts to omit the descriptions thereof.

Other Embodiments

Figure 7:
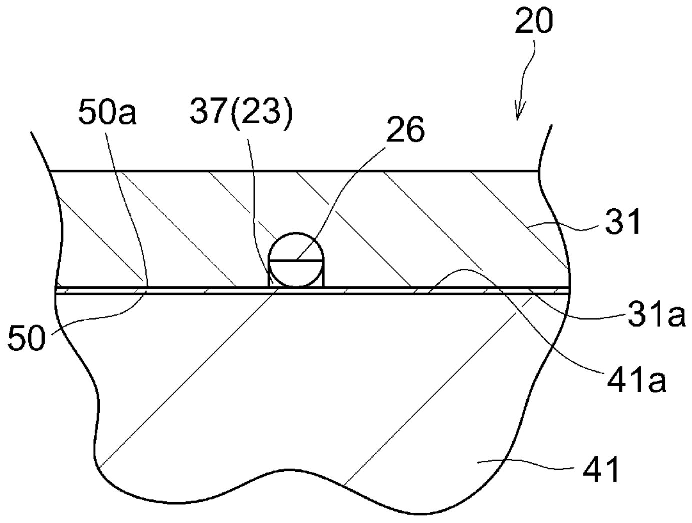
FIG. 7 is a partial cross-sectional view along the A-A line in FIG. 4.

FIGS. 4 to 7 show another embodiment. In the embodiment shown in FIGS. 4 to 7, the nozzle plate body 25 of the nozzle plate 20 includes a first member 31 and a second member 41, which is freely separably joined to the first member 31. The first member 31 and the second member 41 are freely separable along a region in which at least the mixing element 26 is provided in the liquid channel 23, which is formed in the first member 31. FIG. 7 shows the configuration of the nozzle plate 20, and other configurations are omitted.

First Member 31 of Nozzle Plate Body 25

Figure 4:
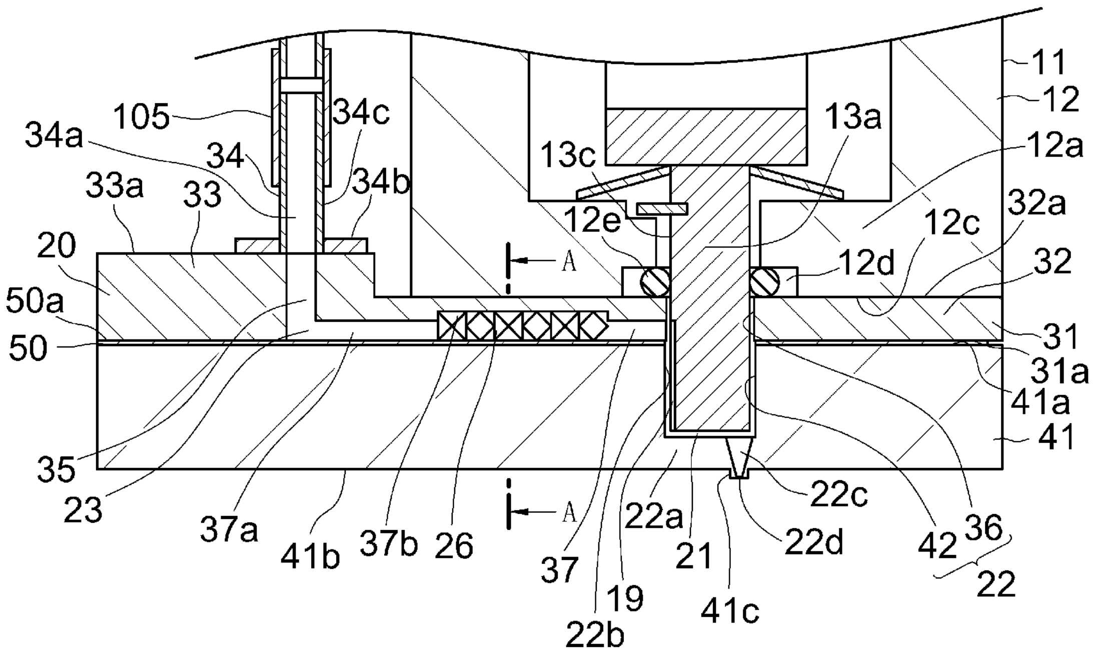
FIG. 4 is an enlarged cross-sectional view showing the main part of another example of the nozzle plate.

The first member 31 is rectangular in plan view. In FIG. 4, the thickness (the length in the vertical direction) of a portion 32 on one end side on the right (also referred to as the "right side portion") is smaller than that of a portion 33 on the other end side on the left (also referred to as the "left side portion"). The upper face 32*a* of the right side portion 32 is attached to the outer face 12*c* of the bottom part 12*a* of the pressurization unit body 12 of the pressurization unit 11. The thickness of the right side portion 32 of the first member 31 is formed as thin as possible to shorten the vertical length of the small diameter part 13*a* of the pressurization member 13; in this embodiment, the thickness is set to 1500 μm, but the thickness is not limited to this value. The left side portion 33 is formed thicker than the right side portion 32 so as to form screw holes 38*b* described later; in this embodiment, the thickness is set to 3000 μm, but the thickness is not limited to this value.

On the upper face 33*a* of the left side portion 33, a single joint part 34 for connection with the liquid supply unit 100 is provided. The joint part 34 includes a cylindrical base 34*b*, which is connected to the nozzle plate body 25 by means of screws or other connecting means (not shown), and a cylindrical connection part 34*c* provided continuously from the base 34*b*, having a smaller diameter than that of the base 34*b*, and to which the liquid supply pipe 105 is connected. Inside the joint part 34, a connection channel 34*a* is formed along the vertical direction. The connection channel 34*a* communicates with an introductory channel 35 provided along the vertical direction within the first member 31. In the first member 31, a through hole 36 for depression, which forms the depression 22, is formed along the vertical direction in a position corresponding to the through hole 12*b* of the pressurization unit body 12. The through hole 36 for depression is circular in plan view, and the diameter of the through hole 36 for depression is set to be substantially the same as the diameter of the through hole 12*b* of the pressurization unit body 12.

Figure 5:
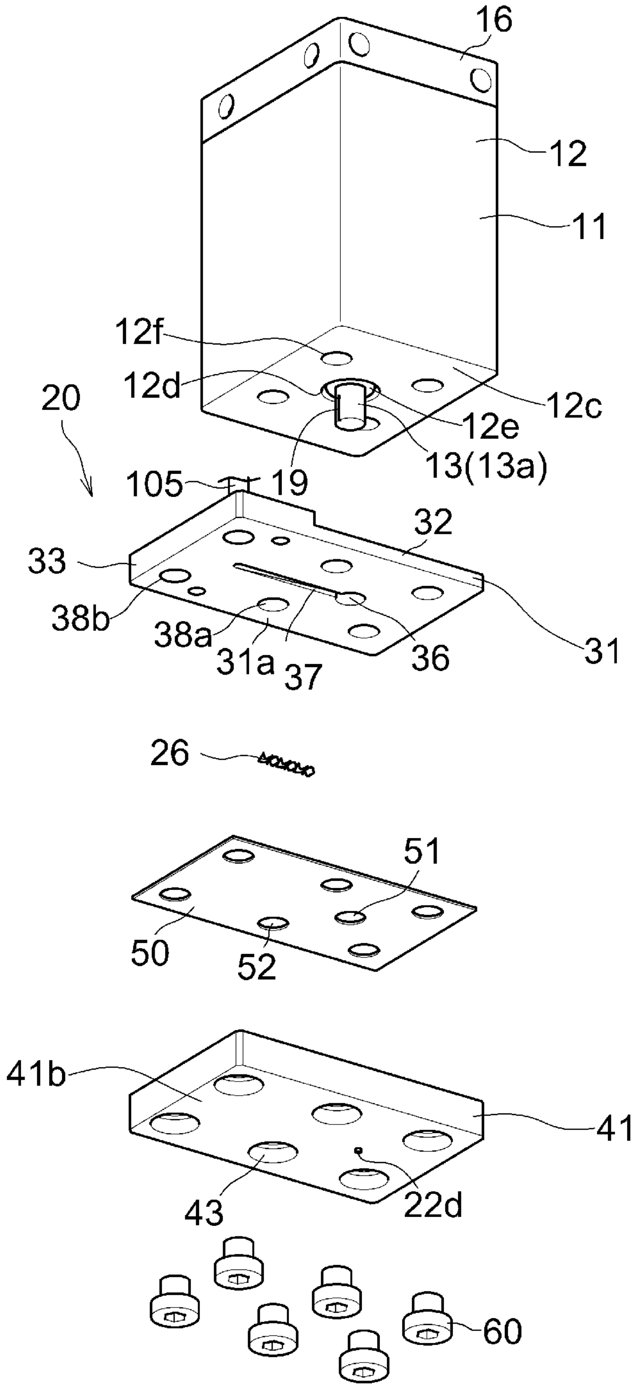
FIG. 5 is an exploded perspective view showing the liquid discharge apparatus.
Figure 6:
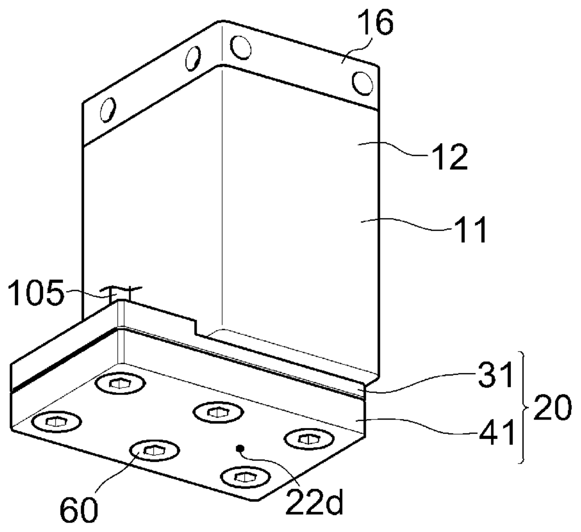
FIG. 6 is a perspective view showing the liquid discharge apparatus.

As shown in FIGS. 4 and 5, the lower face 31*a* of the first member 31 has a groove 37, which communicates with the through hole 36 for depression and the introductory channel 35. The lower side of the groove 37 is open. The groove 37 is composed of a portion 37*b*, in which a mixing element is housed, at the middle in the longitudinal direction (the left-right direction in FIG. 4) of the groove 37, and the other portion 37*a*. The other portion 37*a* has a semicircular cross-sectional shape. As shown in FIG. 7, the portion 37*b*, in which a mixing element is housed, has a semi-elliptical cross-sectional shape, i.e., a shape of a combination of a semi-circular shape that is convex at the top and a rectangular shape below the semi-circle, and is large enough to house the mixing element 26. The cross-sectional area of the portion 37*b*, in which a mixing element is housed, is set larger than the cross-sectional area of the other portion 37*a*. In this embodiment, the introductory channel 35 and the connection channel 34*a*, and the groove 37 and the through hole 36 for depression, are located in a straight line in plan view. The groove 37 forms part of the liquid channel 23 in the state in which the first member 31 and the second member 41 are joined to each other, and the open area is blocked by the second member 41. The groove 37, the introductory channel 35, and the connection channel 34*a* constitute the liquid channel 23. The lower face 31*a* of the first member 31 is joined to the second member 41, and is also called a joint face 31*a*. In this embodiment, although the cross-sectional shape and the cross-sectional area of the portion 37*b*, in which the mixing element is housed, are different from those of the other portion 37*a*, the cross-sectional shape and the cross-sectional area of the other portion 37*a* may be the same as those of the portion 37*b*, in which the mixing element is housed, to form a single groove 37.

In this embodiment, the length of the groove 37 (the length in the left-right direction in FIG. 4), i.e., the sum of the length of the portion 37*b*, in which the mixing element is housed, and the length of the other portion 37*a* is set to about 10000 μm (10 mm), the longest length in the vertical direction (thickness) of the other portion 37*a* is set to about 700 μm (0.7 mm), the length (width) of the other portion 37*a* in the direction orthogonal to the length and thickness in the lower face 31*a* is set to about 1400 μm (1.4 mm), the length of the portion 37*b*, in which the mixing element is housed, is set to about 6000 μm (6 mm), the thickness is set to about 1150 μm (1.15 mm), and the width in the lower face 31*a* is set to 2300 μm (2.3 mm). The sizes of the portion 37*b*, in which the mixing element is housed, and the other portion 37*a* of the groove 37 are not limited to the above values. Further, in this element, the maximum length of each of the blades of the mixing element 26 in side view is set to about 2.3 mm.

As shown in FIG. 5, the right side portion 32 of the first member 31 has screw through holes 38*a* for attaching the nozzle plate 20 to the bottom part 12*a* of the pressurization unit 11. Further, the left side portion 33 of the first member 31 has screw holes 38*b* to attach the second member 41 and a sheet member 50 to the first member 31. In this embodiment, the right side portion 32 has four screw through holes 38*a* while the left side portion 33 has two screw holes 38*b*; however, the number and location of the screw through holes 38*a* and the screw holes 38*b* are not limited to those described in this embodiment.

The first member 31 is formed from a heat-resistant material that can withstand heat of at least 500° C. The first member 31 is preferably composed of metal. In this embodiment, the first member 31 is composed of stainless steel; however, the first member 31 may be composed of any material, including alumina, zirconia, or other ceramics.

Second Member 41 of Nozzle Plate Body 25

As shown in FIGS. 4 and 5, the second member 41 has a rectangular shape, and the upper face 41*a* is a joint face 41*a*, which is joined to the lower face 31*a* of the first member 31. The joint face 41*a* of the second member 41 has a hole 42 for depression, which forms the depression 22, at a position corresponding to the through hole 36 for depression of the first member 31. The hole 42 for depression has a circular shape in plan view, and the diameter of the hole 42 for depression is set to be substantially the same as the diameter of the through hole 36 for depression of the first member 31. The depression 22 composed of the through hole 36 for depression of the first member 31 and the hole 42 for depression of the second member 41 houses the lower end part of the small diameter part 13*a* of the pressurization member 13, which penetrates through the through hole 12*b* of the pressurization unit body 12. A reservoir 21 for storing a liquid is formed between the bottom face 13*d* of the pressurization member 13 and the bottom part 22*a* of the hole 42 for depression.

A discharge channel 22*c* for discharging the liquid stored in the reservoir 21 of the depression 22 is formed at the bottom part 22*a* of the hole 42 for depression. The discharge channel 22*c* is circular in plan view and has a tapered shape with a smaller inner diameter toward the lower side. At the lower face 41*b* of the second member 41, a projection 41*c*, which slightly protrudes downwardly, is formed, and the discharge channel 22*c* penetrates the bottom part 22*a* and the projection 41*c*. The discharge outlet 22*d* of the discharge channel 22*c* is open at the lower end of the projection 41*c*.

The thickness of the second member 41, i.e., the length in the vertical direction, excluding the thickness of the projection 41*c*, is set to a thickness that does not cause flexure of the second member 41 due to the pressure applied to the liquid stored in the reservoir 21 by the pressurization member 13 during the liquid discharge operation. On the other hand, the thickness of the second member 41 is set as thin as possible from the viewpoint of making the small diameter part 13*a* of the pressurization member 13 as short as possible.

As shown in FIG. 5, the second member 41 has screw through holes 43 for attaching the nozzle plate 20 to the bottom part 12*a* of the pressurization unit 11. In this embodiment, the number of the screw through holes 43 corresponds to the number of the screw through holes 38*a* and the screw holes 38*b* of the first member 31, and the locations of the screw through holes 43 correspond to the locations of the screw through holes 38*a* and the screw holes 38*b* of the first member 31; however, the number and locations of the screw through holes 43 are not limited to those described in this embodiment.

The second member 41 is formed from a heat-resistant material that can withstand heat of at least 500° C. The second member 41 is preferably composed of metal. In this embodiment, the second member 41 is composed of stainless steel; however, the second member 41 may be composed of any material, including alumina, zirconia, or other ceramics.

Sheet Member 50

The first member 31 and the second member 41 are joined through a sheet member 50 between them. The state in which the first member 31 and the second member 41 are freely separably joined includes the state in which they are joined through the sheet member 50. The sheet member 50 has a shape and size corresponding to the first member 31 and the second member 41 in plan view, is formed from PET (polyethylene terephthalate), has a thickness of 50 μm, and has flexibility. As shown in FIG. 5, the sheet member 50 has a through hole 51 for depression at the position corresponding to the through hole 36 for depression of the first member 31 and the hole 42 for depression of the second member 41, and has screw through holes 52 at positions corresponding to the screw through holes 38*a* and 43 and the screw holes 38*b* of the first member 31 or the second member 41. At least the upper face 50*a* of the sheet member 50 facing the joint face 31*a* of the first member 31 is release-treated. The release treatment is a treatment for making the sheet member 50 easily peelable from at least the first member 31. For example, the treatment may be performed by applying a release agent to a face.

In this embodiment, the material of the sheet member 50 for use is PET (polyethylene terephthalate) as a rigid resin sheet. It is also preferable to use PP (polypropylene), which has sufficiently low adhesion properties. It is also possible to use, for example, metals, such as stainless steel and aluminum. In this case, the thickness is preferably 10 μm to 30 μm from the viewpoint of flexibility. The presence of the sheet member 50 between the first member 31 and the second member 41 prevents liquid from entering and solidifying between the first member 31 and the second member 41, and prevents the first member 31 and the second member 41 from adhering to each other and becoming inseparable. In the configuration of this embodiment, it is also possible that the sheet member 50 is not provided.

A step 12*d* for housing an O-ring 12*e* is formed on the outer face 12*c* of the pressurization unit body 12 of the pressurization unit 11 and around the through hole 12*b* such that the O-ring 12*e* prevents the liquid in the nozzle plate 20 from flowing into the pressurization unit body 12. Further, screw holes 12*f* are provided on the outer face 12*c* for attaching the nozzle plate 20.

Joining First Member 31 and Second Member 41

As shown in FIG. 5, the nozzle plate 20 is attached to the pressurization unit 11 by inserting screws 60 from the lower face 41*b* of the second member 41 of the nozzle plate 20 through the screw through holes 43, 52, and 38*a* and into the screw holes 38*b* and 12*f*. The screws are set to have a length such that the lower end of the screw head is located within the screw through holes 43 of the second member 41, and such that the screws 60 do not protrude from the lower face 41*b* of the second member 41. While the first member 31 and the second member 41 are joined to each other through the sheet member 50, the open area at the lower side of the groove 37 of the first member 31 is covered by the sheet member 50 and the second member 41, whereby the groove 37 constitutes part of the liquid channel 23. That is, the first member 31 and the second member 41 are freely separable along the groove 37, which is part of the liquid channel 23 and is a region in which at least the mixing element 26 is provided in the liquid channel 23.

During the liquid filling operation into the reservoir 21, the solenoid valve of the liquid supply unit 100 is opened, and a predetermined pneumatic pressure is supplied from the air pressure source into the syringes 101A and 101B to push the different types of liquids out of the syringes 101A and 101B. The liquids are then introduced into the introductory channel 35 of the nozzle plate 20 of the liquid discharge apparatus 10 through the liquid supply pipe 105, and the liquid then flows through the groove 37 into the reservoir 21 of the depression 22. Since the mixing element 26 is disposed at the groove 37, the different types of liquids are sufficiently mixed by the mixing element 26. After the liquid discharge operation is completed once, the liquid discharge apparatus 10 performs the liquid filling operation. The liquid supply operation and the liquid discharge operation are repeated alternately.

Since other configurations are the same as those in the embodiment shown in FIG. 1, the same reference numerals are used to refer to corresponding parts to omit the descriptions thereof.

According to the above configuration, the mixing element 26 is provided at the groove 37, whereby the different types of liquids can be sufficiently mixed within the nozzle plate 20. Further, in this embodiment, the mixing element 26 is disposed within the liquid channel 23, which communicates with the depression 22 having the reservoir 21, and the two different types of liquids supplied from the liquid supply unit 100 are mixed immediately before discharge from the nozzle plate 20. When the liquid to be discharged is a mixture of multiple different types of liquids, such as a two-component adhesive, and is a liquid whose viscosity increases after mixing, the viscosity of the mixed liquid can be prevented from increasing at the time of discharge since the mixing is performed immediately before discharge, and the time between the mixing and discharging is short.

When an operator removes the screws 60, the nozzle plate 20 is detached from the pressurization unit 11, and additionally, the first member 31 and the second member 41 are separated from each other. Accordingly, the groove 37 of the first member 31, which constitutes the liquid channel 23, is made open, allowing the mixing element 26 to be easily attached to or detached from the groove 37. This makes it easy to clean the mixing element 26 and the groove 37. Further, the introductory channel 35 of the first member 31 can be cleaned from the groove 37 side. Furthermore, the hole 42 for depression, which forms the depression 22, of the second member 41 and the discharge channel 22*c* can be easily cleaned from the upper side. In particular, when the liquid to be discharged from the nozzle plate 20 is a two-component curable adhesive comprising a main agent and a curing agent or is a UV-curable resin, the liquid is likely to remain and solidify in the liquid channel 23, the reservoir 21, and the discharge channel 22*c* of the nozzle plate 20, requiring frequent cleaning; thus, ease of cleaning is important.

When the liquid to be discharged is a liquid that easily solidifies, such as a two-component adhesive or a UV-curable resin, the liquid may solidify and adhere inside the liquid channel 23, the reservoir 21, and the discharge channel 22*c*, and the adhering substance may not be removed even with the use of cleaning tools. In this embodiment, the first member 31 and the second member 41 are formed from heat-resistant materials; thus, it is possible to detach the nozzle plate 20 from the pressurization unit 11, separate the first member 31 from the second member 41, and heat the first member 31 and the second member 41 to 500° C. or more. The adhering solidified substance can be removed by heating.

Further, in this embodiment, the joint part 34 for connection with the liquid supply unit 100 is provided on the upper face 33*a* of the first member 31, which is close to the pressurization unit 11, instead of at the second member 41, at which the discharge channel 22*c* is provided, and which is located below the first member 31. Since the distance between the workpiece (an object to be discharged) and the second member 41 is several hundred micrometers to several millimeters, if the joint part 34 is provided at a side face of the second member 41, a tube etc. of the liquid supply unit 100, which is connected to the joint part 34, may come into contact with the workpiece. However, in this embodiment, the joint part 34 is provided on the upper face of the first member 31, which is close to the pressurization unit 11, preventing the liquid supply unit 100 from coming into contact with the workpiece. Further, the liquid supply unit 100 can be connected to the joint part 34 of the nozzle plate 20 from the upper side, making it easier to connect the liquid supply unit 100 to the nozzle plate 20, compared with the case in which the joint part 34 is provided at a side face.

Another Embodiment

In the embodiment shown in FIG. 4, the joint faces 31*a* and 41*a* of the first member 31 and the second member 41 are faces orthogonal to the direction of the liquid flow in the discharge channel 22*c* (in the left-right direction in FIG. 1); however, it is not limited to this configuration. For example, the joint face 31*a* of the first member 31 and the joint face 41*a* of the second member 41 may be oblique faces tilted with respect to, for example, the left-right direction. In yet another embodiment, the groove 37 may be formed on a side face in addition to the lower face 31*a* of the first member 31, and the second member 41 may have a cross-sectional L-shape, with the joint face of one L-shaped piece of the second member 41 being joined to the side face of the first member 31 while the joint face of the other piece of the second member 41 being joined to the lower face of the first member 31, whereby the open portion of the groove 37 may be covered to form a liquid channel 23. The groove 37 on the side face of the first member 31 is covered by the second member 41 to form an introductory channel 35, and the first member 31 and the second member 41 are separated along the groove 37 and the introductory channel 35.

In the embodiment shown in FIG. 4, the groove 37 is formed only in the first member 31; however, the groove 37 may be formed on at least the face 31*a* of the first member 31 or the face 41*a* of the second member 41, or both. It is also possible that the groove 37 is formed only in the second member 41, and the mixing element 26 is disposed.

Another Embodiment

Figure 8:
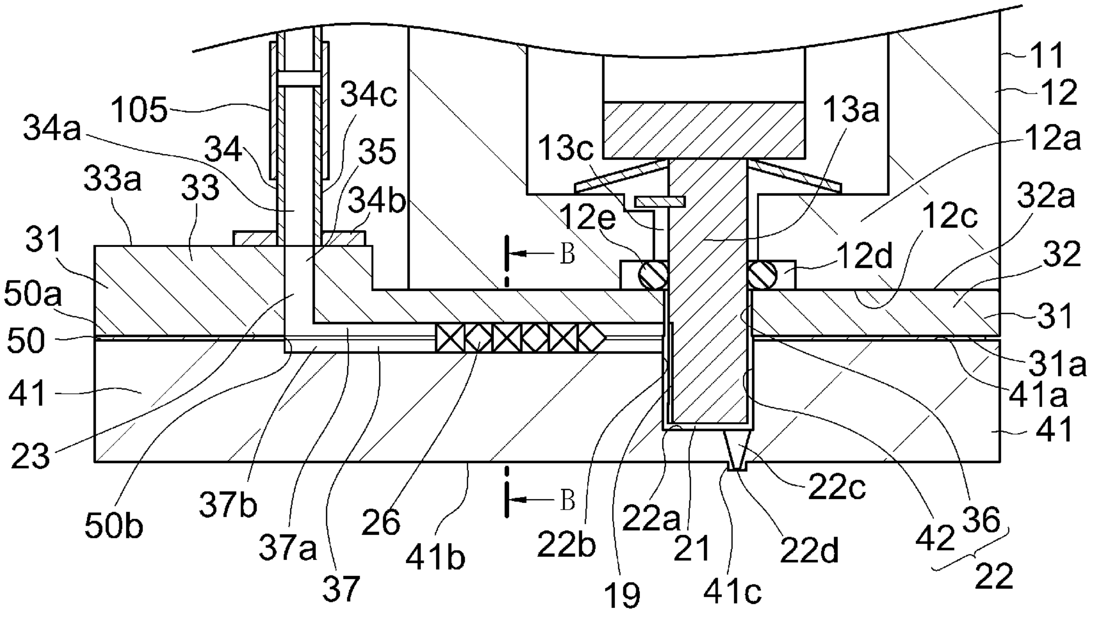
FIG. 8 is an enlarged cross-sectional view showing the main part of another example of the nozzle plate.
Figure 9:
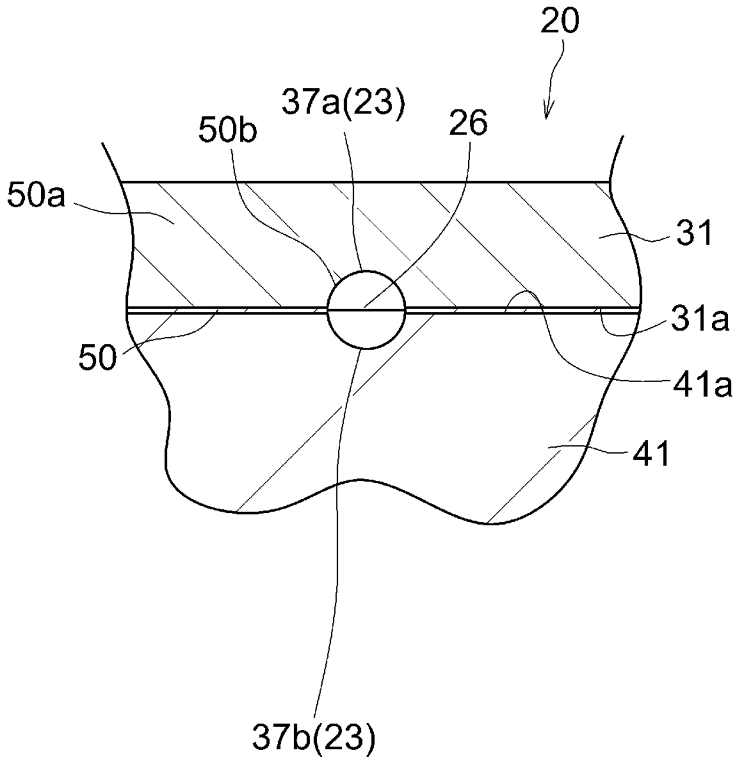
FIG. 9 is a partial cross-sectional view along the B-B line in FIG. 8.

As shown in FIGS. 8 and 9, the groove 37 of the nozzle plate body 25 may be composed of a groove 37*c* formed in the first member 31 and a groove 37*d* formed in the second member 41. The groove 37*c* of the first member 31 has a semicircular cross-sectional shape. The groove 37*d* of the second member 41 has a semicircular cross-sectional shape that is vertically inverted from the shape of the groove 37*c*, is located at a position corresponding to the groove 37*c* of the first member 31, and has the same size as the groove 37*c* of the first member 31. When the first member 31 and the second member 41 are joined, the groove 37*c* of the first member 31 and the groove 37*d* of the second member 41 form a groove 37 having a substantially circular cross-sectional shape, excluding the thickness of the sheet member 50. In FIG. 8, the cross-sectional shape of the groove 37 does not have a circular shape since the thickness of the sheet member 50 is shown larger for illustrative purposes; however, the actual thickness of the sheet member 50 is so thin as to be negligible. As shown in FIG. 9, the diameter of the circle of the groove 37 is substantially the same as the maximum length of the mixing element 26 in side view, and the mixing element 26 has a size such that the mixing element is abutted to the inner wall of the groove 37 without forming a gap between the inner wall of the groove 37 and the blades of the mixing element 26. The sheet member 50 has a long hole 50*b* at a position corresponding to the groove 37*c* of the first member 31 and the groove 37*d* of the second member 41 so that the sheet member 50 is not located within the liquid channel 23 composed of the grooves 37*c* and 37*b*. Since other configurations and functions are the same as those in the embodiment shown in FIG. 4, the same reference numerals are used to refer to corresponding parts to omit the descriptions thereof. FIG. 9 shows the configuration of the nozzle plate 20, and other configurations are omitted.

In the embodiment shown in FIGS. 8 and 9, the groove 37*c* of the first member 31 and the groove 37*d* of the second member 41 are set to have the same length (the length in the left-right direction in FIG. 8); however, the length of either the groove 37*c* or the groove 37*d* may be set to be substantially the same as the length of the mixing element 26. In this case, the mixing element 26 is disposed at a portion having a substantially circular shape formed by the groove 37*c* and the groove 37*d* in the groove 37, and the portion at which the mixing element 26 is disposed has a larger cross-sectional area than the other portions of the groove 37.

According to the configuration above, the cross-sectional shape of the groove 37 is substantially circular, and no gap is formed between the inner wall of the groove 37 and the blades of the mixing element 26, whereby the liquid is mixed more reliably.

Another Embodiment

Figure 10:
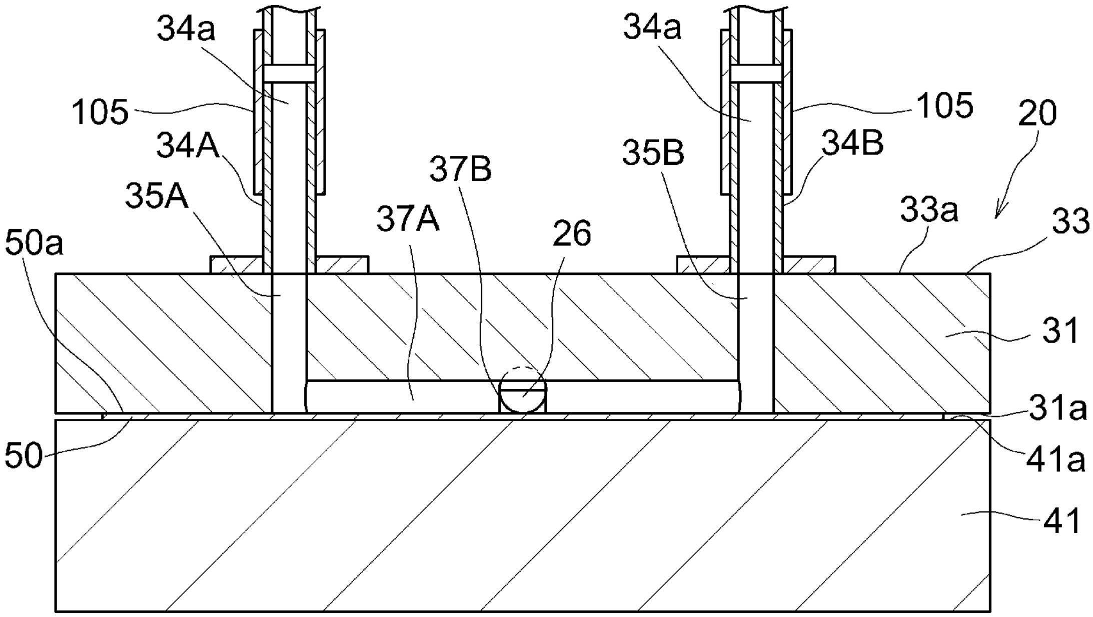
FIG. 10 is an enlarged cross-sectional view from the side of the main part of another example of the nozzle plate, and is a cross-sectional view along the C-C line in FIG. 11.
Figure 11:
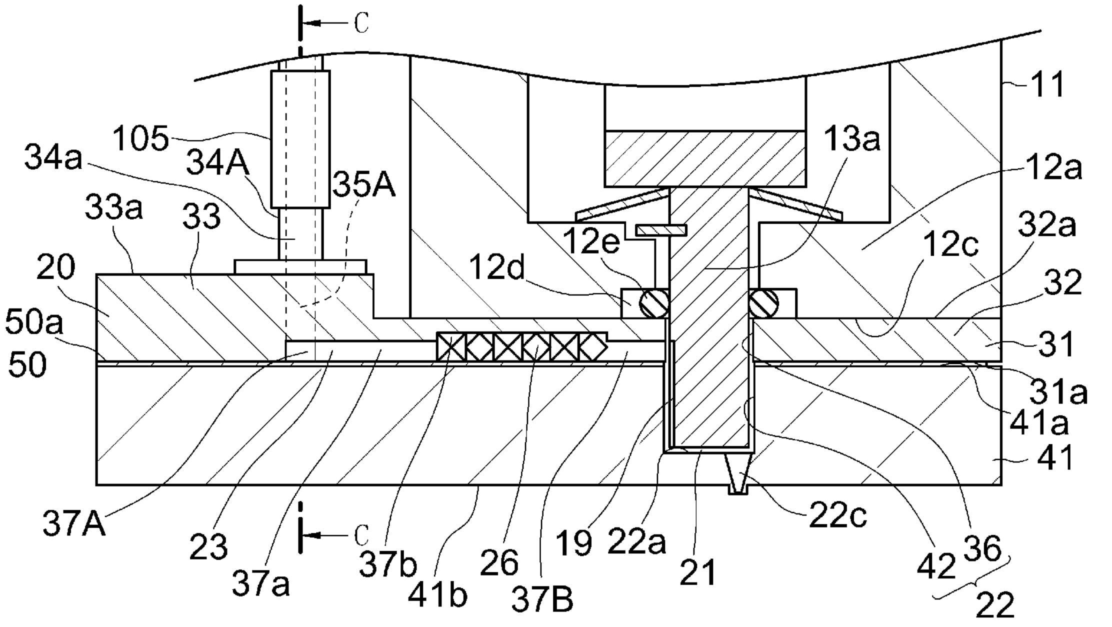
FIG. 11 is a cross-sectional view from the front of the nozzle plate shown in FIG. 10.

FIGS. 10 and 11 show another embodiment according to the present invention. The points that differ from the embodiment shown in FIG. 4 are described here. As shown in FIGS. 10 and 11, two joint parts 34A and 34B are provided in parallel in side view on the upper face 33*a* of the left side portion 33 of the first member 31. The first member 31 has introductory channels 35A and 35B, which respectively communicate with the connection channels 34*a* of the joint parts 34A and 34B. A groove 37A, which communicates with the introductory channels 35A and 35B, is formed at the lower face 31*a* of the first member 31, and a groove 37B, which communicates with the groove 37A, is formed in the left-right direction in FIG. 11. The groove 37B communicates with a through hole 36 for depression. The mixing element 26 is disposed at the groove 37B. The groove 37A has a semicircular cross-sectional shape. The groove 37B has the same configuration as that described in the embodiment shown in FIG. 4. The lower side of the grooves 37A and 37B is open. The first member 31 is joined to the second member 41 through a sheet member 50, whereby the grooves 37A and 37B constitute part of the liquid channel 23. The grooves 37A and 37B, the introductory channels 35A and 35B, the connection channels 34*a* and 34*a* constitute the liquid channel 23. Alternatively, the grooves 37A and 37B may only be provided in the second member 41. Further, alternatively, as in the embodiment shown in FIG. 8, a groove may be provided in the first member 31 and the second member 41 to form the liquid channel 23.

One ends of the liquid supply pipes 105A and 105B are respectively connected to the connection parts 34*c* of the joint parts 34A and 34B, and the other ends are connected to the syringes 101A and 101B of the liquid supply unit 100.

When liquids are supplied from the syringes 101A and 101B, the liquids pass through the connection channels 34*a* of the joint parts 34A and 34B and join together in the groove 37A. The liquid then passes through the groove 37B and introduced into the depression 22. The liquid is sufficiently mixed by the mixing element 26 when passing through the groove 37B. To the mixed liquid stored in the reservoir 21 of the depression 22, pressure is applied by the pressurization member 13, and the liquid is discharged from the discharge channel 22*c*. Since other configurations are the same as those in the embodiment shown in FIG. 4, the same reference numerals are used to refer to corresponding parts to omit the descriptions thereof.

Even when the liquids supplied from the syringes 101A and 101B are not sufficiently mixed, curing is initiated when the liquids are joined together, and the viscosity increases. According to the above configuration, the liquids supplied from the syringes 101A and 101B are supplied through separate connection channels 34*a* and joined together in the groove 37A, which is located on the immediately upstream side of the groove 37B, at which the mixing element 26 is disposed. Thus, curing of the liquid is initiated immediately before the liquid is mixed by the mixing element 26, which further prevents the viscosity of the liquid from increasing at the discharge by the liquid discharge apparatus 10.

The dimensions, materials, shapes, relative arrangements, etc. of the components described as embodiments or shown in the drawings are not intended to limit the scope of present invention and are merely illustrative examples. Terms representing equality, such as “same,” “identical,” “equal,” and “homogeneous” not only represent a state of strict equality, but also a state in which there are tolerances or differences in the equality to the extent that the same functions can be obtained. The expressions for quadrilateral and circular shapes not only represent quadrilateral, cylindrical, and other shapes in the strict geometric sense, but also represent shapes that include unevenness, chamfers, etc. to the extent that the same effect can be obtained. The expressions “comprising,” “having,” “including,” “containing,” and “is provided,” are not exclusive expressions that exclude the presence of other components. “Parallel” and “orthogonal” mean substantially “parallel” and “orthogonal,” including not only strict parallel and orthogonal, but also parallel and orthogonal with errors of several degrees.

DESCRIPTION OF THE REFERENCE NUMERALS

10 Liquid discharge apparatus
11 Pressurization unit
12 Pressurization unit body
13 Pressurization member
14 Drive part
20 Nozzle plate
21 Reservoir
22*c* Discharge channel
22*d* Discharge outlet
23 Liquid channel
25 Nozzle plate body
26 Mixing element
31 First member
31*a* Joint face
34 Joint part
34*a* Connection channel
41 Second member
41*a* Joint face
50 Sheet member
70 Joint part
34A Joint first member
34B Joint second member
100 Liquid supply unit

The invention claimed is:

1. A nozzle plate comprising:

a reservoir for storing a liquid, a liquid channel for introducing a liquid supplied from a liquid supply unit into the reservoir, and a discharge channel for discharging the liquid stored in the reservoir, wherein a mixing element for mixing the liquid is freely detachably provided at the liquid channel, the nozzle plate further comprises a first member and a second member freely separably joined to the first member, and the first member and the second member are freely separable in a direction orthogonal to the direction in which the liquid channel extends and in a region in which at least the mixing element is provided in the liquid channel.

2. The nozzle plate according to claim 1, which comprises a nozzle plate body comprising at least the reservoir and the discharge channel, and a joint part freely detachably provided with the nozzle plate body, the joint part being for connection to the liquid supply unit, wherein the mixing element is provided at a channel of the joint part constituting at least part of the liquid channel.

3. The nozzle plate according to claim 1, which comprises a joint part for connection to the liquid supply unit, the joint part comprising the first member and the second member, wherein the mixing element is provided at a groove of the joint part constituting at least part of the liquid channel.

4. The nozzle plate according to claim 1, which comprises a nozzle plate body comprising the reservoir and the discharge channel, the nozzle plate body comprising the first member and the second member, wherein the mixing element is provided at a groove of the nozzle plate body constituting at least part of the liquid channel.

5. The nozzle plate according to claim 4, further comprising multiple joint parts each connected to the liquid supply unit and into which different types of liquids are individually supplied from the liquid supply unit, wherein channels of the multiple joint parts constituting at least part of the liquid channel communicate with the groove of the nozzle plate body, and the different types of liquids are mixed by the mixing element.

6. The nozzle plate according to claim 1, wherein a face of the first member or a face of the second member, or both, the faces being joined to each other, include a groove.

7. The nozzle plate according to claim 6, wherein the faces of the first member and the second member are joined to each other through a sheet member.

8. A liquid discharge apparatus for discharging a liquid by applying pressure to the liquid, comprising a pressurization unit and the nozzle plate of claim 1 provided at the lower end of the pressurization unit, wherein the pressurization unit comprises a pressurization unit body, a pressurization member supported by the pressurization unit body in a freely movable manner in a vertical direction, the pressurization member protruding from the pressurization unit body such that the lower end part is housed in the reservoir, the pressurization member being for applying pressure to the liquid introduced into the reservoir from the liquid channel and discharging the liquid from the discharge channel, and a drive part for moving the pressurization member in the vertical direction.

* * * * *